(12) United States Patent
Rehling

(10) Patent No.: US 10,189,416 B2
(45) Date of Patent: Jan. 29, 2019

(54) STORAGE COMPARTMENT FOR A VEHICLE INTERIOR TRIM

(71) Applicant: Volkswagen Aktiengesellschaft, Wolfsburg (DE)

(72) Inventor: Peter Rehling, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/795,895

(22) Filed: Oct. 27, 2017

(65) Prior Publication Data

US 2018/0065565 A1    Mar. 8, 2018

Related U.S. Application Data

(63) Continuation of application No. PCT/EP2016/054304, filed on Mar. 1, 2016.

(30) Foreign Application Priority Data

Apr. 27, 2015    (DE) .................... 10 2015 207 699

(51) Int. Cl.
*B60R 7/08* (2006.01)
*B60R 7/04* (2006.01)

(52) U.S. Cl.
CPC .............. *B60R 7/087* (2013.01); *B60R 7/04* (2013.01)

(58) Field of Classification Search
CPC ............ B60R 7/087; B60R 7/04; B60R 7/046
USPC .................................. 296/39.1, 37.8, 37.13
See application file for complete search history.

(56) References Cited

U.S. PATENT DOCUMENTS

| 2,897,974 | A | * | 8/1959 | Cook .................. A47G 23/06 |
| | | | | 108/44 |
| 2,963,256 | A | * | 12/1960 | Borah ............. A47G 23/0225 |
| | | | | 215/393 |
| 7,490,886 | B1 | * | 2/2009 | Walke ..................... B60N 3/101 |
| | | | | 296/37.8 |
| 8,490,846 | B1 | | 7/2013 | Wheatley et al. |
| 10,029,620 | B1 | * | 7/2018 | Huebner ................... B60N 3/10 |
| 2004/0129747 | A1 | * | 7/2004 | Maierholzner ........ B60N 3/102 |
| | | | | 224/544 |
| 2005/0206179 | A1 | | 9/2005 | Chiku et al. |

(Continued)

FOREIGN PATENT DOCUMENTS

DE    600 02 131 T2    3/2004
DE    102 45 739 A1    4/2004

(Continued)

*Primary Examiner* — Jason S Morrow
(74) *Attorney, Agent, or Firm* — Muncy, Geissler, Olds & Lowe, P.C.

(57) ABSTRACT

A storage compartment for an interior trim of a vehicle including a storage-compartment bottom, which transitions at an inner corner region into a side wall raised up from the storage-compartment bottom and which is lined with an insertion mat, which forms a support surface for at least one small object, in particular coins. The insertion mat at least partially bounds at least one free deformation chamber. In the event of manual application of pressure to the support surface, for example by fingertips, the insertion mat is deformed with curvature into the deformation chamber and an undercut, accessible to the fingertips, for reaching below the object is formed between the deformed support surface and the object.

15 Claims, 4 Drawing Sheets

(56) References Cited

U.S. PATENT DOCUMENTS

| | | | |
|---|---|---|---|
| 2007/0182183 A1* | 8/2007 | Lota | B60R 7/04 296/24.34 |
| 2009/0179449 A1 | 7/2009 | Shibata et al. | |
| 2010/0001151 A1* | 1/2010 | Wheatley | B60R 11/00 248/206.2 |
| 2011/0095556 A1* | 4/2011 | Werner | B60N 3/105 296/24.34 |
| 2013/0017356 A1* | 1/2013 | Hipshier | B29C 44/5681 428/76 |
| 2016/0229354 A1* | 8/2016 | Bettzuege | B60R 11/0252 |
| 2018/0208128 A1* | 7/2018 | Villar Mesa | B60R 7/04 |
| 2018/0215320 A1* | 8/2018 | Mendoza Vera | B60R 7/04 |

FOREIGN PATENT DOCUMENTS

| | | |
|---|---|---|
| DE | 10 2006 045 249 A1 | 4/2008 |
| DE | 10 2008 033 112 A1 | 1/2010 |
| DE | 10 2008 058 107 A1 | 5/2010 |
| DE | 10 2009 024 386 A1 | 12/2010 |
| DE | 10 2010 053 494 A1 | 7/2011 |
| DE | 10 2010 052 827 A1 | 5/2012 |
| DE | 10 2011 085 999 A1 | 5/2013 |
| EP | 1 065 103 A1 | 1/2001 |
| EP | 2 492 147 A2 | 8/2012 |

* cited by examiner

STORAGE COMPARTMENT FOR A VEHICLE INTERIOR TRIM

This nonprovisional application is a continuation of International Application No. PCT/EP2016/054304, which was filed on Mar. 1, 2016, and which claims priority to German Patent Application No. 10 2015 207 699.7, which was filed in Germany on Apr. 27, 2015, and which are both herein incorporated by reference.

BACKGROUND OF THE INVENTION

Field of the Invention

The invention relates to a storage compartment for a vehicle interior trim.

Description of the Background Art

For the storage of coins, money cards or other small objects, deep, narrow storage options can be provided within direct reach of the vehicle occupant on a vehicle interior trim, for example, on a cup holder fixture or on the center console or on the instrument panel.

From DE 10 2008 033 112 AI, a generic storage compartment is known, comprising a storage-compartment bottom, which is shifted downwards from an access opening by a height offset and which transitions into a side wall raised up from the storage-compartment bottom. The storage-compartment bottom is lined with an insertion mat which is formed from an elastomeric material, which forms a support surface for the small objects. In the storage compartment known from DE 10 2008 033 112 AI, the insertion mat is in full contact with the storage-compartment bottom, and the support surface is flat.

In particular, in a storage compartment that is formed narrow and deep, it is only possible to remove coins or other small objects with difficulty, sacrificing comfort. Due to lack of adequate access, the coin can only be removed from the narrow, deep compartment by means of the fingertips.

SUMMARY OF THE INVENTION

It is therefore an object of the invention to provide a cost-effective storage compartment for a vehicle interior trim, in which the removal of small objects is made possible without sacrificing comfort even if the storage compartment is designed narrow and deep.

An exemplary embodiment of the invention is based on the observation that in the prior art, it is difficult for a vehicle occupant to reach under a coin, by means of the fingertips, which is lying flat on the support surface of the storage compartment in order to remove it from a narrow and deep storage compartment. Against this background, an exemplary embodiment provides a free deformation chamber that is at least partially integrated in the insertion mat. When manual pressure is applied, for example by means of the fingertips of the vehicle occupant, said chamber causes a deformation of the support surface of the insertion mat. Said support surfaces curves into the free deformation chamber. Between the thus deformed support surface and the small object lying in the storage compartment, for example a flat-lying coin, an undercut is formed which is more accessible to the fingertips, which allows for reaching under the small object. In this way, in particular in a narrow and deep storage compartment, small objects can be removed comfortably in a cost effective manner.

The insertion mat can be elastically compliant under pressure, that is to say deformable under buildup of a restoring force. When the fingertip pressure ceases, the insertion mat automatically returns to its undeformed state with the reduction in the restoring force. For example, the insertion mat can be made from an elastomeric material.

In an embodiment, the free deformation chamber can be integrated in the solid material of the insertion mat, i.e., be completely bounded by the solid material of the insertion mat. Alternatively, in a technically simpler implementation, the free deformation chamber may not only be integrated in the insertion mat, but rather be formed between the insertion mat and the storage-compartment bottom. As mentioned above, the insertion mat can be made of an elastomeric material, for example of an elastic plastic soft component. On the other hand, the storage compartment can be formed from a plastic hard component, namely with a smooth inner surface. When removing the, for example, coin, it can first be gripped from below by means of the fingertips and pressed in an upright position against a side wall of the storage compartment. Subsequently, the coin can be pushed upwards by means of the fingertips in the direction of removal along the smooth inner side of the storage compartment.

In a technical implementation in the undeformed state, the insertion mat can have a curve in the direction of removal. Correspondingly, the support surface of the insertion mat that is provided is also curved. In contrast, together with the storage-compartment bottom, the underside of the insertion mat bounds the free deformation chamber.

By way of example, the insertion mat can be realized with the bottom of the mat resting at least partially on the storage-compartment bottom, the mat bottom transitioning at its edge to a circumferential edge web. The edge web may be contour-adapted for fixed positioning of the insertion mat in the storage compartment of the inner corner region (i.e., the transition between the storage-compartment bottom and the side wall raised up therefrom) of the storage compartment, and can bear form-fittingly against the inner corner region of the storage compartment. In this case, to form the curve, the mat bottom can be curved spherically upwards, starting from the circumferential edge web to a central apex location in the removal direction.

In an embodiment, the mat bottom of the insertion mat can have a consistently constant material thickness as well as a closed surface. At the circumferential edge web, the material thickness can be decreased towards a top edge of the edge web.

In an embodiment, the mat bottom of the insertion mat can be curved in the removal direction in the non-deformed state, that is to say it is not fully flat. In an embodiment, the storage-compartment bottom may be formed flat over the entire surface, that is, with a planar support surface for the small objects. In this case, the mat bottom of the insertion mat may have a varying material thickness for forming the free deformation chamber. In this way, the material thickness in the mat bottom can be varied (namely, on its bottom side facing the storage-compartment bottom) to provide, for example, a pocket-shaped recess and/or additional webs.

In the assembly position, the storage surface can be spaced apart by a height offset from a preferably narrow and slot-shaped access opening. The width of the latter may be in the range of 25 to 50 mm, in particular of the order of 30 mm. On the other hand, its length can be several times greater and can be in a range of 60 to 100 mm, preferably about 80 mm. The above-mentioned height offset between the storage compartment access opening and the bottom storage surface may in this case be in a range of 50 to 90 mm, preferably 70 mm.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
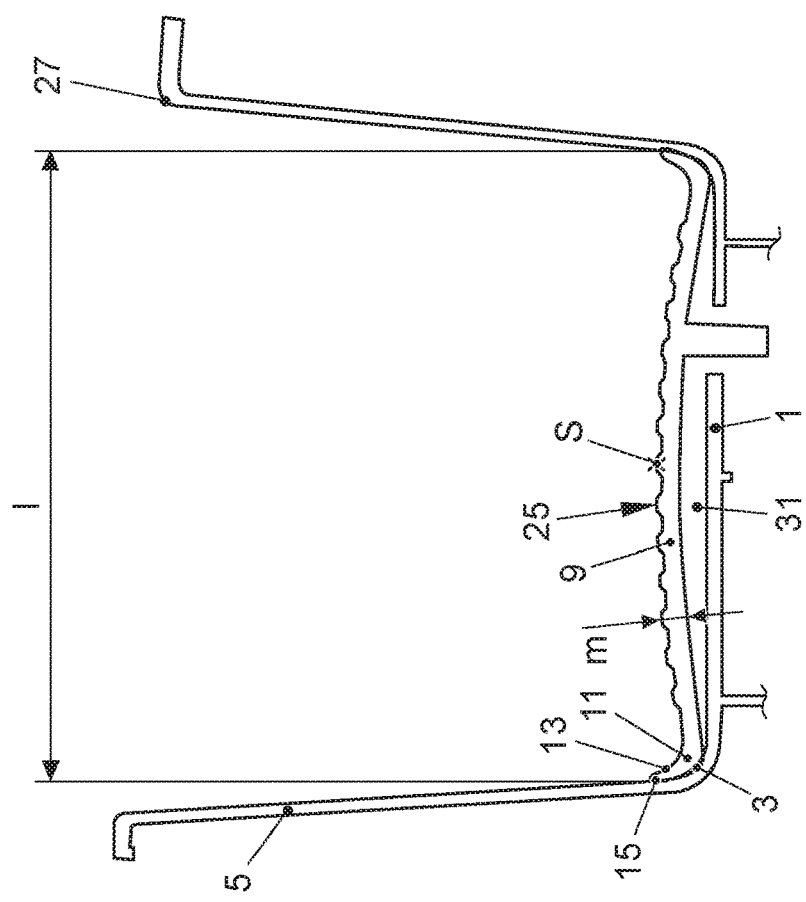
FIGS. 1 and 2 are sectional representations of different cross sections of an embodiment of a storage compartment for a vehicle interior trim.
Figure 2:
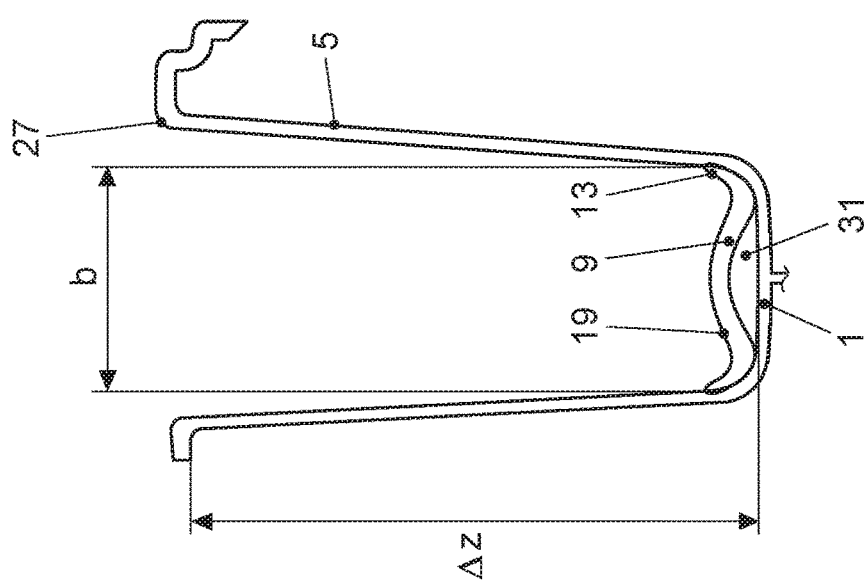
Figure 3:
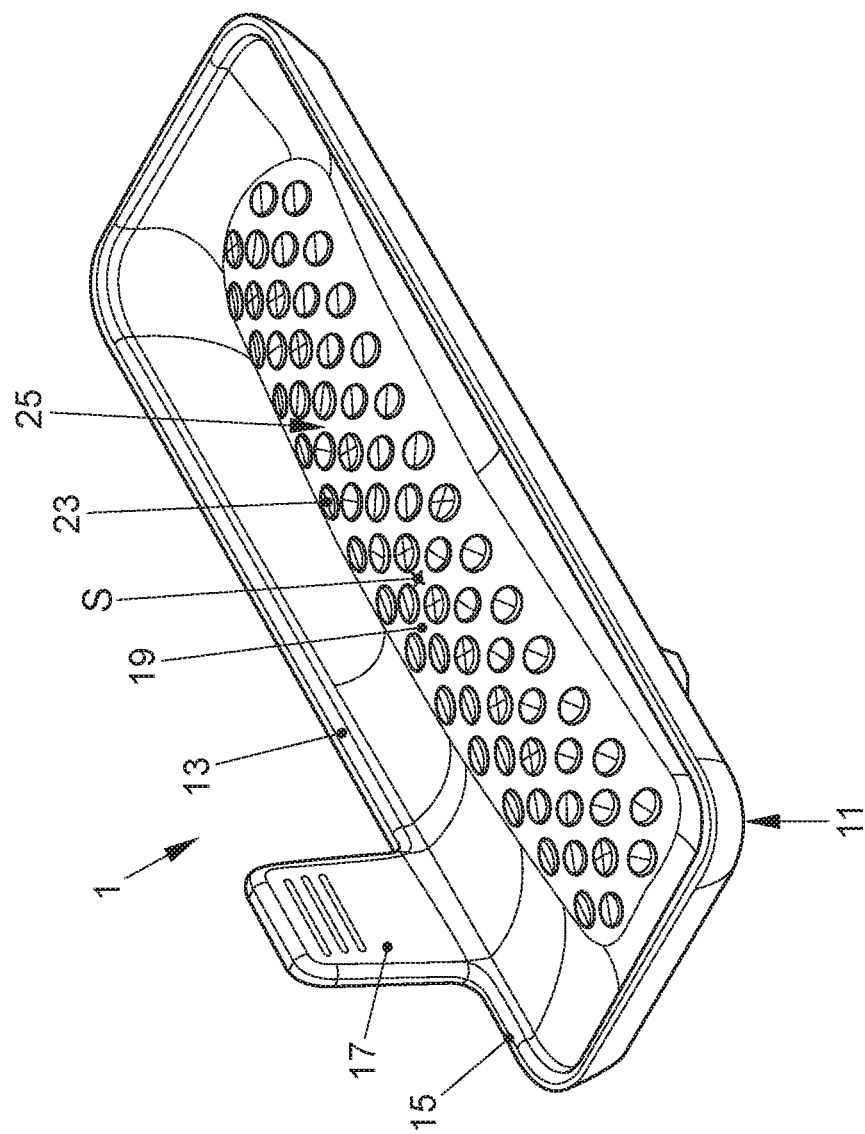
FIG. 3 is an insertion mat by itself, lining the storage-compartment bottom of the storage compartment in FIGS. 1 and 2.
Figure 5:
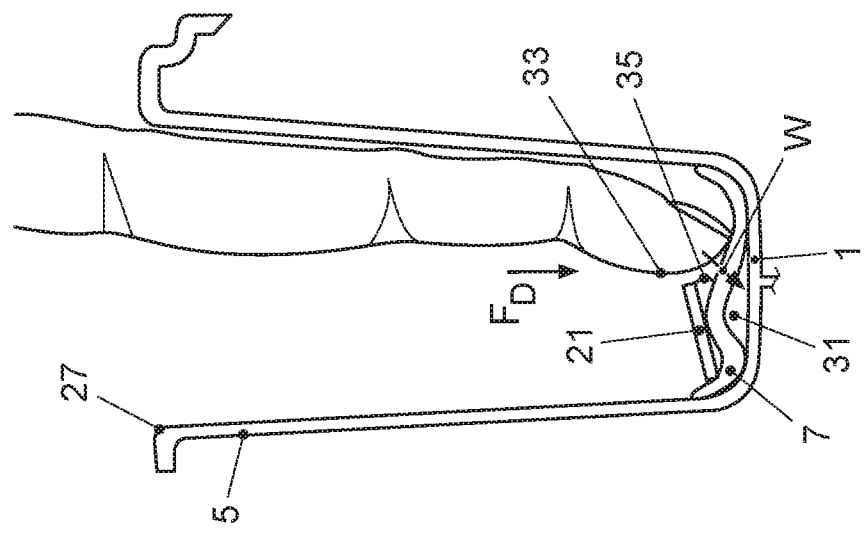
FIGS. 4 to 6 are views in each case illustrating a process for removing a coin from the storage compartment in FIGS. 1 and 2.
Figure 4:
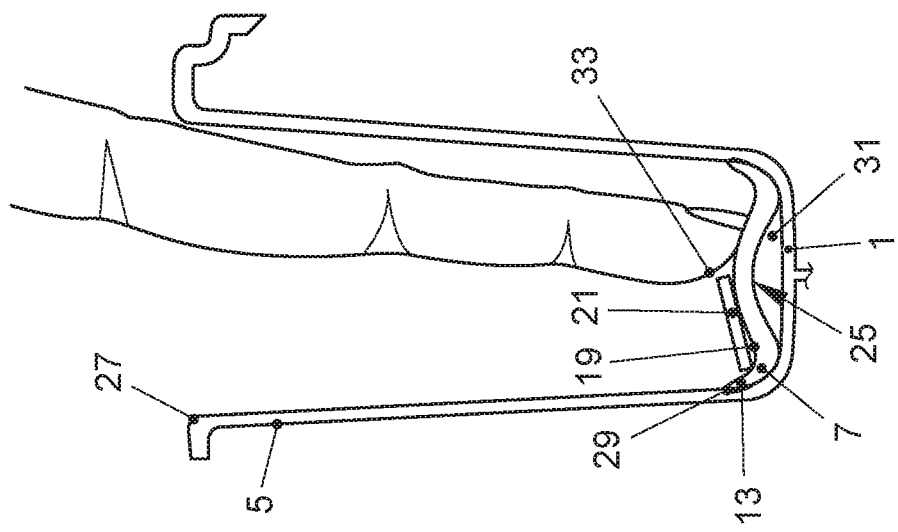
Figure 6:
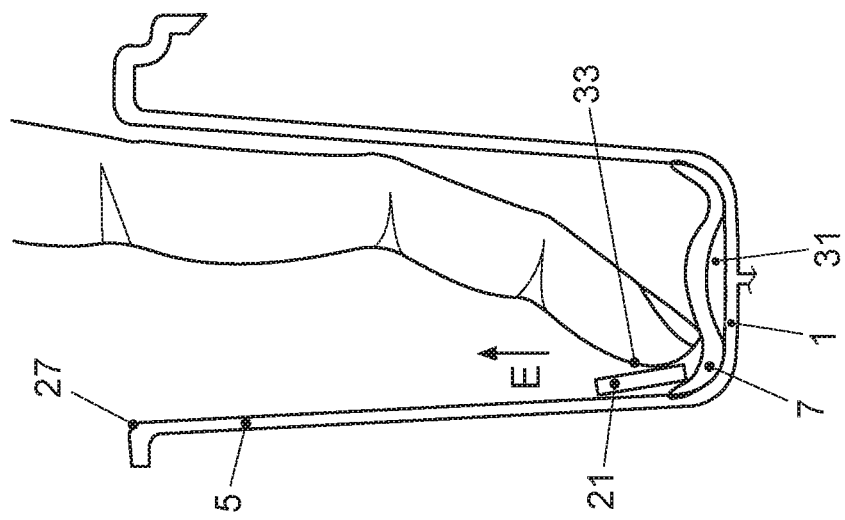

As can be seen in FIGS. 1 and 2, the storage compartment has a storage-department bottom 1 which transitions at an inner corner region 3 into a circumferential side wall 5 which is raised up from the storage-compartment bottom. In FIGS. 1 and 2, the storage-compartment bottom 1 is lined with a rubbery insertion mat 7, for example, made from an elastomeric material. In FIG. 3, the insertion mat 7 is shown by itself in a perspective view. Accordingly, the insertion mat 7 is formed with a mat bottom 9, which transitions into the edge into an upwardly projecting circumferential edge web 13 while forming an outer corner region 11. According to FIG. 3, the edge web 13 extends upwards at its upper edge 15 with a mounting tab 17, by means of which an extension of the insertion mat 7 from the storage compartment is simplified. The upper side of the mat bottom 9 of the insertion mat 7 forms the storage compartment support surface 19 for supporting small objects, such as a coin 21 (FIGS. 4 to 6). As is apparent from FIG. 3, the support surface 19 is provided with a knob-like surface structure 23.

In the non-deformed state (FIGS. 1 to 3), the support surface 19 and the mat bottom 9 are not designed in a full-surface planar manner, but rather with a curve 25 which faces upwards in the removal direction E (FIG. 6), that is, in the direction of an upper access opening 27 of the storage compartment. Starting from the circumferential edge web 13 to the central vertex S (FIG. 3), the curve 25 is arched upwards in a dome-shape. As is further apparent from FIGS. 1 to 6, the mat bottom 9 of the insertion mat 7 is formed with a continuously constant material thickness m. In contrast, the material thickness m decreases on the circumferential edge web 13 until it reaches its upper edge 15.

In the installed position 15, the upper edge 15 of the insertion mat 7 engages under a step-like mounting stop 29 in the side wall 5 of the storage compartment, in order to achieve a stationary positioning of the insertion mat 7 in the storage compartment. In the installation position shown in FIGS. 1 and 2 as well as 4 and 6, in the circumferential direction, the outer corner region 11 of the insertion mat 7 is continuously in form-locking engagement with the storage compartment inner corner region 3. In contrast, a free deformation chamber 31 is defined between the mat bottom 9 formed in the curve 25 and the planar storage-compartment bottom 1, which serves as a removal aid for removing small objects, such as the coin 21 shown in FIG. 4.

As is apparent from FIG. 4, the coin 21 rests substantially flat on the upwardly curved support surface 19. In order to remove the coin 21, the vehicle occupant presses with his fingertips 33 against the upwardly curved support surface 19. By means of this pressure application $F_D$, the mat bottom 9 of the insertion mat 7 deforms in such a way that it partly arches into the free deformation chamber 31. With this arching W (FIG. 5) into the deformation chamber 31, an undercut 35, freely accessible for the fingertips 33, results between the deformed support surface 19 and the flat-lying coin 21, whereby according to FIG. 6, the flat-lying coin 21 can be grasped from underneath by means of the fingertips 33 and can be pressed against the smooth-surfaced side wall 5 of the storage compartment into an upright position in a convenient manner. Subsequently, the coin 21 placed upright can be pushed upwards along the side wall 5 in a removal direction E.

The insertion mat 7 with the curve 25 integrated therein is designed resiliently, that is, deformable upon pressurization $F_D$ by building up a restoring force. Upon removal of the pressurization $F_D$, the insertion mat 7 is again automatically restored to its undeformed state with the removal of the restoring force.

The mechanism of action described above with reference to FIGS. 4 to 6 is particularly important in the case of a narrow and deep storage compartment. By way of example, the support surface 19 can be spaced apart from the narrow slot-shaped access opening 27 by a height offset $\Delta z$, which is in the range of about 70 mm. The width b of the access opening may be approximately 30 mm, while the length l is approximately 80 mm.

Figure 7:
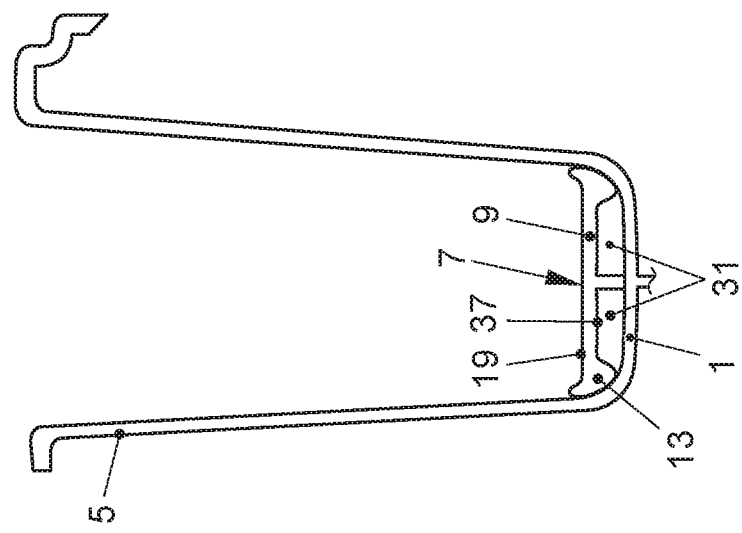
FIG. 7 illustrates an embodiment of a storage compartment in a view corresponding to FIG. 1.

In FIG. 7, a storage compartment according to an embodiment is shown, of which the basic structure is identical to the structure of the first embodiment of a storage compartment shown in FIGS. 1 to 6. For this reason, reference is made to the description of FIGS. 1 to 6. In contrast to the first embodiment of FIGS. 1-6, FIG. 7 shows the mat bottom 9 as well as the support surface 19 designed not curved upwards in the undeformed state, but rather curved in a planar manner across the full surface. The free deformation chamber 31 is defined between the storage-compartment bottom 1 and the mat bottom 9. In contrast to the preceding first exemplary embodiment, however, in FIG. 7 the material thickness m in the mat bottom 9 is not continuously constantly configured, but rather the material thickness m varies. In this way, by way of example, two pocket-like recesses 37 separated from each other by a central web 37 are formed on the underside of the mat bottom 9, which together form a two-part free deformation chamber with the storage-compartment bottom 1. Upon pressurization $F_D$ by means of the fingertips 33 of the vehicle occupant, the mat bottom 9 also curves into the free deformation chamber 31, whereby a coin located in the storage compartment can be grasped from below in a simple manner.

In the case of a particularly narrow storage compartment, that is, a storage compartment-bottom 1 of a particularly small width, the central web 37 shown in FIG. 7 may be omitted since in the case of conventional loading loads, the strength of the insertion mat 7, accordingly narrow under these circumstances, is then sufficient to hold a free deformation chamber 31 upright between the storage compartment bottom 1 and the mat bottom 9, even without a central web 37 and/or a curve 25 of the insertion mat 7.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A storage compartment for an interior trim of a vehicle, the storage compartment comprising:
    a storage-compartment bottom that transitions at an inner corner region into a side wall that is raised from the storage-compartment bottom; and
    an insertion mat lining the storage-compartment bottom, the insertion mat forming a support surface for at least one small object, the insertion mat at least partially bounds at least one free deformation chamber, and when manual pressure via a fingertip is applied to the support surface, the insertion mat curves into the deformation chamber by arching such that between the deformed support surface and the object, an undercut for grasping under the object is accessible to the fingertips.

2. The storage compartment according to claim 1, wherein the free deformation chamber is formed between the insertion mat and the storage-compartment bottom.

3. The storage compartment according to claim 1, wherein, in the undeformed state, when forming the free deformation chamber, the insertion mat has an upwards curve aligned in a removal direction.

4. The storage compartment according to claim 1, wherein the insertion mat is formed with a mat bottom resting at least partially on the storage-compartment bottom, which is contoured in an inner corner region of the storage compartment and is in positive engagement with the storage compartment inner corner region.

5. The storage compartment according to claim 4, wherein, in the undeformed state, when forming the free deformation chamber, the insertion mat has an upwards curve aligned in a removal direction, and wherein, for forming the upwards curve, the mat bottom is curved upwards in a dome-shape in the removal direction starting from a circumferential edge web to a central apex point.

6. The storage compartment according to claim 4, wherein the mat bottom of the insertion mat has a continuously constant material thickness.

7. The storage compartment according to claim 1, wherein the insertion mat is made of a plastic soft component, and wherein the storage compartment is made of a plastic hard component.

8. The storage compartment according to claim 1, wherein the storage-compartment bottom is planar over an entire surface.

9. The storage compartment according to claim 1, wherein, in the undeformed state, the support surface of the insertion mat is planar across its entire surface.

10. The storage compartment according to claim 4, wherein the mat bottom of the insertion mat has a varying material thickness for the formation of the free deformation chamber.

11. The storage compartment according to claim 10, wherein the mat bottom of the insertion mat has at least one recess for forming the free deformation chamber on its side facing the storage-compartment bottom with a decrease in material thickness.

12. The storage compartment according to claim 1, wherein by a height offset, the support surface is spaced apart from a narrow slot-shaped access opening having a width in a range of 25 to 50 mm and a length in a range of 60 to 100 mm.

13. The storage compartment according to claim 12, wherein the height offset between the access opening and the support surface is in the range from 50 to 90 mm.

14. The storage compartment according to claim 1, wherein the insertion mat is elastically resiliently deformed under buildup of a restoring force, and wherein upon removal of the pressurization, the insertion mat automatically returns to an undeformed state when the restoring force decreases or is removed.

15. The storage compartment according to claim 1, wherein the insertion mat is made of an elastomeric material.

\* \* \* \* \*